US007256586B2

United States Patent
Schmid

(10) Patent No.: US 7,256,586 B2
(45) Date of Patent: Aug. 14, 2007

(54) METHOD AND DEVICE FOR MEASURING THE REPEATABLE AND NON-REPEATABLE RUNOUT OF ROTATING COMPONENTS OF A SPINDLE MOTOR

(75) Inventor: Guido Schmid, Triberg (DE)

(73) Assignee: Minebea Co. Ltd, Nagano (JP)

( * ) Notice: Subject to any disclaimer, the term of this patent is extended or adjusted under 35 U.S.C. 154(b) by 690 days.

(21) Appl. No.: 10/404,669

(22) Filed: Apr. 3, 2003

(65) Prior Publication Data

US 2003/0210060 A1 Nov. 13, 2003

(30) Foreign Application Priority Data

Apr. 6, 2002 (DE) .............................. 102 15 252

(51) Int. Cl.
G01R 27/26 (2006.01)
G01B 7/312 (2006.01)
(52) U.S. Cl. ................. 324/662; 360/77.03; 369/44.32
(58) Field of Classification Search ................ 324/662, 324/207.25; 360/77.03
See application file for complete search history.

(56) References Cited

U.S. PATENT DOCUMENTS

| | | | | |
|---|---|---|---|---|
| 3,488,581 A | * | 1/1970 | Foster | 324/662 |
| 3,889,504 A | * | 6/1975 | Ichiryu et al. | 72/9.4 |
| 4,183,060 A | * | 1/1980 | Barnette et al. | 369/106 |
| 4,300,226 A | * | 11/1981 | Barnette et al. | 369/43 |
| 4,527,263 A | * | 7/1985 | Nakagawa | 369/44.32 |
| 5,365,458 A | | 11/1994 | Tamura | |
| 5,761,821 A | * | 6/1998 | Laycock | 33/555.1 |
| 6,683,744 B2 | * | 1/2004 | Takano et al. | 360/78.11 |
| 6,792,669 B2 | * | 9/2004 | Codilian | 29/603.03 |
| 6,895,656 B2 | * | 5/2005 | Yoshida | 29/603.03 |
| 6,904,010 B1 | * | 6/2005 | Kuroba et al. | 369/53.3 |
| 2006/0066985 A1 | * | 3/2006 | Hirano et al. | 360/77.03 |

FOREIGN PATENT DOCUMENTS

DE 3632465 C2 1/1990
DE 3719422 C2 7/1993

OTHER PUBLICATIONS

German Patent Office, Search Report, Jun. 28, 2002.

* cited by examiner

*Primary Examiner*—Anjan Deb
(74) *Attorney, Agent, or Firm*—Joel E. Lutzker, Esq.; John C. Garces, Esq.; Schulte Roth & Zabel LLP

(57) ABSTRACT

The method and a device to measure the repeatable and non-repeatable runouts of a rotating component of a spindle motor with the aid of at least one probe measuring changes in the distance between the probe and the rotating component depending on the angle of rotation. The probe records a first test signal in a first test cycle from which a signal defining the RRO is determined and stored. In a second test cycle, a command signal proportional to the amplitude and phase of the RRO signal is generated and fed to an electromechanical actuator supporting the probe. Depending on the command signal derived from the first test signal, the actuator changes the distance between the probe and the outer perimeter of the rotating component, thus compensating the runout defined by the RRO signal, while the probe records a second test signal defining the NRRO.

16 Claims, 3 Drawing Sheets

METHOD AND DEVICE FOR MEASURING THE REPEATABLE AND NON-REPEATABLE RUNOUT OF ROTATING COMPONENTS OF A SPINDLE MOTOR

CROSS-REFERENCE TO RELATED APPLICATIONS

This application claims all rights of priority to German Patent Application Serial No. DE 102 15 252.7, filed Apr. 6, 2002 (pending).

BACKGROUND

The invention relates to a device and a method of measuring a non-repeatable axial and/or radial runout of rotating components, particularly of the rotor of a spindle motor used, for example, to power hard disk drives.

Such spindle motors deployed in hard disk drives are used to power a magnetic disk on which data in the form of magnetized areas can be written and read out again by means of a read/write head.

At least one magnetic disk is secured to the rotor of the spindle motor. The rotor, driven by an electromagnetic rotating field, has a rotary bearing arranged in a bearing system. Roller bearings are preferably used in the bearing system, although fluid dynamic bearings may be used as well. Due to unavoidable component and assembly tolerances, there are substantial deviations between the actual and the theoretical rotational axis. Moreover, the position of the rotational axis varies over time, such that the distance between the rotor or its surface and a stationary point of reference does not show a constant measured value but rather a value changing over time. This value changes depending on the angle of rotation. This variation of the position of the rotational axis can lead to errors in reading and writing data onto the magnetic disk and, in the worst case, to a collision of the read/write head with the magnetic disk.

The runout of the rotor due to deviations in the actual rotational axis is defined in practice by the value of the RRO (Repeatable Runout), wherein a distinction should be made between $RRO_{axial}$ (axial runout) and $RRO_{radial}$ (radial runout). RRO is a measurement of the deviation in the actual rotational axis due to an off-center alignment, tilt, surface imperfections or deviations in form due to the manufacturing process. For modern spindle motors used in hard disk drives, RRO is typically in the order of approximately 10 µm.

Superimposed on the RRO is the NRRO (Non Repeatable Runout), which results from random or stochastic deviations which, in contrast to the RRO, only appear irregularly with respect to both the phase relationship and its amplitude. NRRO is caused by irregularities stemming from the bearing system. In the case of roller bearings, for example, NRRO may result from irregularities in shapes of races and/or rollers, surface defects and diameter tolerances. For modern spindle motors used in hard disk drives, NRRO is typically in the order of approximately 10 nm and is thus several magnitudes smaller than RRO.

RRO and NRRO are measured with the aid of an appropriate measuring device. For this purpose, the spindle motor is set into a test station. Using a capacitive probe, where the distance of the probe from the rotor depends on the angle of rotation, both variables are measured while the motor is rotating. RRO and NRRO can be directly determined from the probe's output signal. The RRO typically generates a periodic signal represented as a sinusoid-shaped graph. The NRRO is superimposed on the sinusoid signal. FIG. 3 shows a variation of a typical test signal depending on the angle of rotation. The test signal essentially defines a sinusoid curve whose period corresponds to a rotational period of the motor under test.

Since the NRRO is much smaller than the RRO, the NRRO test signal is also very small in comparison to the RRO signal. The resolution of the measuring device is determined and set on the basis of the maximum amplitude of the RRO signal, so that the remaining resolution for the NRRO signal is extremely small. If the test signal is digitalized, for example with a resolution of 12 bit, the measured values of the NRRO are in the region of 1-2 bit. An exact measurement of the NRRO is thus only possible within limits. However, even then the resolution is inadequate.

SUMMARY

The object of the invention is to create a device to measure the repeatable and non-repeatable runouts (RRO; NRRO) of a rotating component. It is an object of the invention to provide a method allowing to determine the NRRO with substantially higher resolution and precision.

According to the invention, the probe records a first test signal in a first test cycle from which a signal defining the RRO is determined and stored. In a second test cycle, a command signal proportional to the amplitude and phase of the RRO signal is generated and fed to an electromechanical actuator supporting the probe which, in dependence on the command signal, changes the distance between the probe and the outside perimeter of the rotating component and thus compensates the runout defined by the RRO signal, while the probe records a second test signal defining the NRRO.

Due to the presently provided compensation or fade-out of the RRO, the NRRO can now be determined with a resolution of approximately 1 nm. Compensation for the RRO is achieved using an adjusting element which dynamically adjusts the position of the probe in such a way that the movement of the probe follows the amplitude and phase of the RRO signal obtained from the first test signal. As a result, the probe now only measures the random, non-repeatable deviations which define the NRRO. The sensitivity and/or the measuring range of the probe can be adjusted to the expected measured values of the NRRO, so that the useful resolution of the evaluation unit can be fully exploited.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENTS AND THE DRAWINGS

Figure 1:
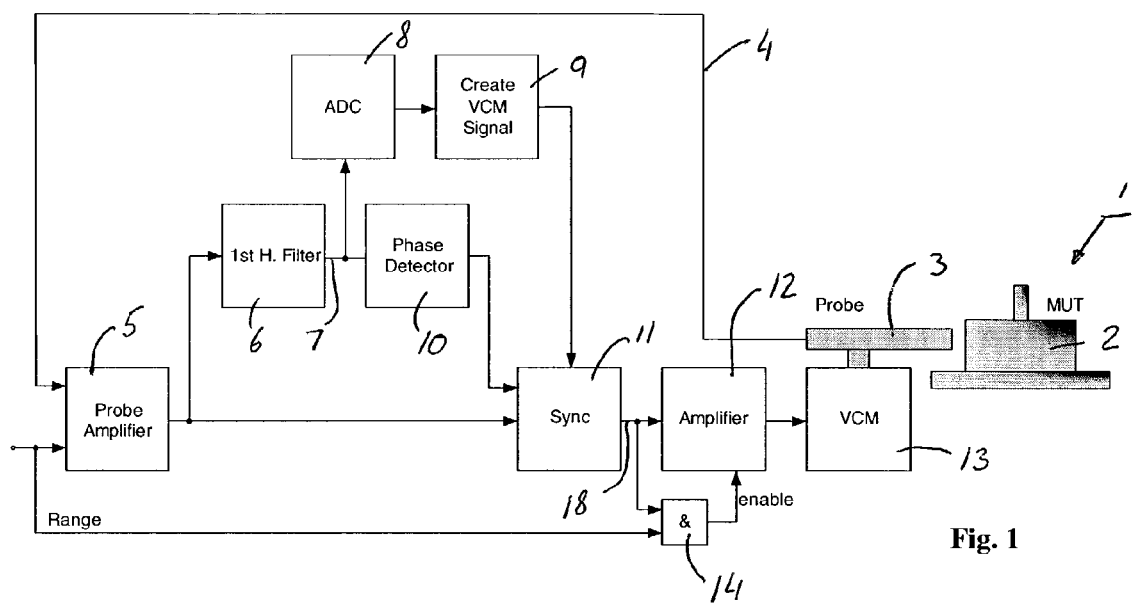
FIG. 1 is a block diagram of a first embodiment of the measurement geometry.

Using the test geometry shown in FIG. 1, the RRO and NRRO of a Motor under Test 1 ("MUT") or of a rotor 2 of the MUT 1 can be measured. For this purpose, the motor is set into a test station with a positioned capacitive probe 3. The capacitive probe 3 measures changes in the distance to the surface of the rotor 2 and converts these changes into electric test signals, while the MUT 1 rotates.

To begin a first test cycle, the probe 3 is positioned at a precisely specified distance from the surface of the rotor 2 to be scanned. During the first test cycle, probe 3 operates within a first measuring range. Distance changes of +/−50 µm can be recorded within the first measuring range. Rotor 2 of the MUT 1 is put into rotation at a constant rpm speed. In the first test cycle it is basically sufficient to measure a single revolution of the rotor 2.

The test signal 4 is fed into an amplifier 5, amplified there, and can then be picked up at the amplifier out-port and processed further. The test signal 4 includes the RRO and the superimposed NRRO and resembles a sinusoid oscillation whose frequency corresponds to the frequency of the rotor 2.

Figure 4:
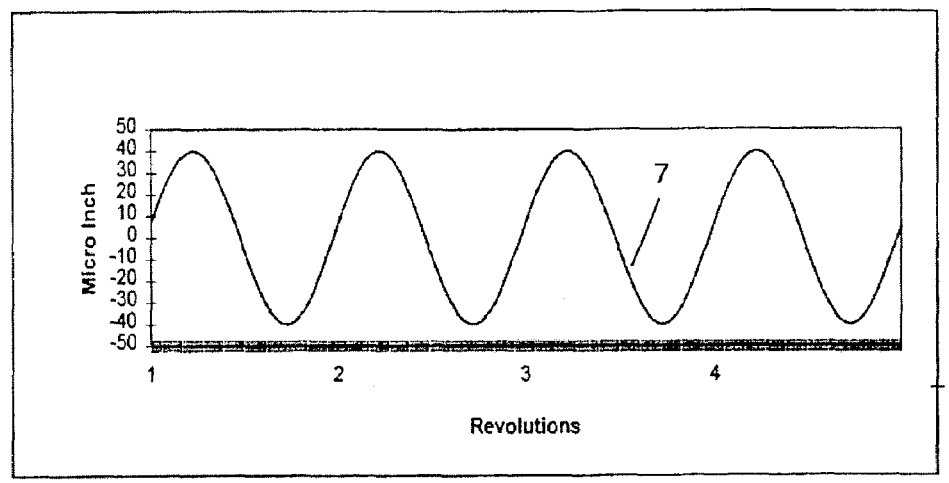
FIG. 4 is a sample illustration of the RRO signal extracted from the first test signal to trigger the VCM for the probe.

From the out-port of the amplifier 5, the test signal 4 is fed to a filter 6 which only lets through the basic oscillation of the test signal and filters out the overtones. A low-pass filter, for example, can be used here. The signal 7 coming from the low-pass filter 6 defines the RRO (RRO signal) depending on the angle of rotation of the rotor 2. The RRO signal is illustrated in FIG. 4.

To enable the NRRO to be ascertained with greater precision, the RRO signal 7 is fed into an A/D converter 8, digitalized and stored in a storage unit 9. The RRO signal 7 is also fed into a phase detector 10 which produces a phase signal at its out-port. Zero points of the RRO signal can be derived from the outputted phase signal.

In a synchronization unit 11, the RRO signal 7 stored in the storage unit is synchronized to a current phase relationship of the relevant test signal 4. Specifically, the stored signal 7 is read out of the storage unit 9 synchronic to the current phase relationship of the rotor 2. The synchronization unit 11 emits a command signal 18 proportional to the amplitude and phase relationship of the RRO signal 7.

The synchronized command signal 18 is fed into an amplifier 12 whose output signal triggers an electromechanical actuator 13. As soon as the synchronic command signal 18 is produced, a second test cycle is preferably automatically started via a switching element 14 which activates the out-port of the amplifier 12 to feed the command signal 18 to the actuator 13.

The actuator 13 is preferably a so-called Voice Coil Motor ("VCM") which enables very rapid and precise adjusting movements in the µm region. The probe 3 is located on the actuator 13 so that its position can be adjusted in a vertical direction with respect to the measured surface of the rotor 2.

Figure 5:
FIG. 5 is a sample illustration of the NRRO signal extracted from the second test signal.

Following the command signal 18, the VCM 13 and the associated probe 3 are set to track, in phase, the runout of the rotor 2 defined by the RRO signal 7. The probe 3 is now operated in a second, more sensitive test range with which, for example, changes in distances of +/−2 µm can be recorded. During the second test cycle, the probe performs distance measurements while tracking the course of the RRO signal 7. Accordingly, changes in distances stemming from the RRO are faded-out in the latest recorded, second test signal. The second test signal 15 corresponds to the NRRO signal superimposed on the RRO signal. Due to the sensitive measuring range, the NRRO signal 15 can be very precisely measured. FIG. 5 shows a typical curve of an NRRO signal depending on the angle of rotation of the rotor.

Figure 2:
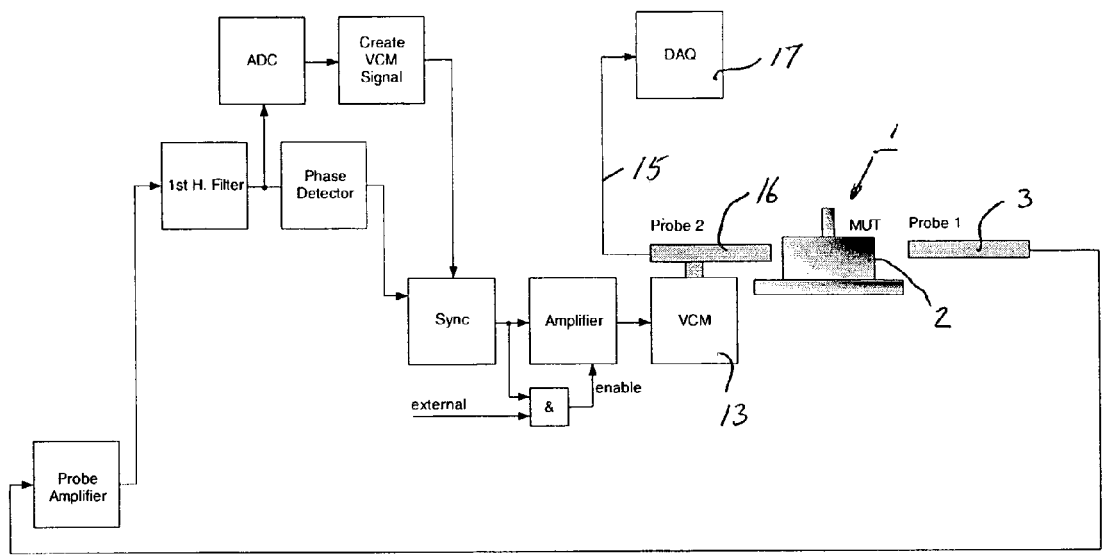
FIG. 2 is a block diagram of a second embodiment of the measurement geometry.
Figure 3:
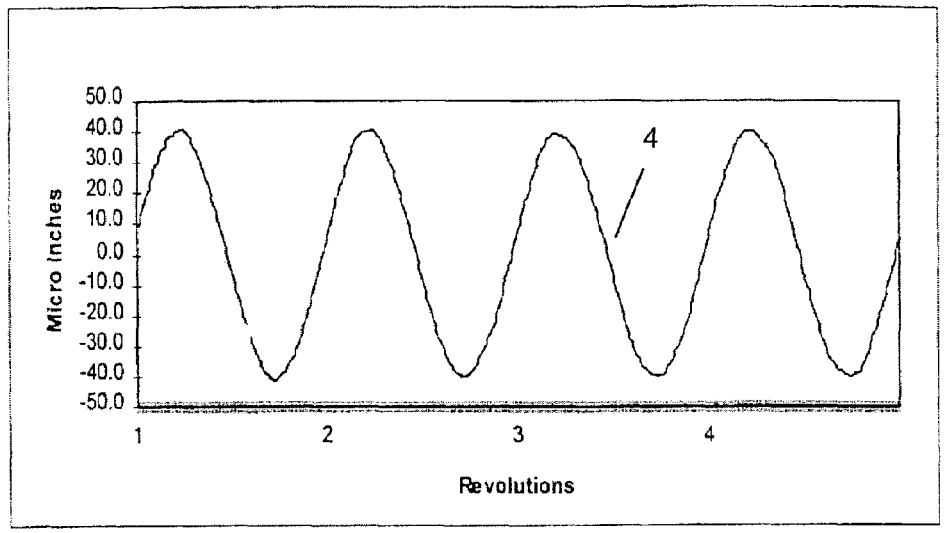
FIG. 3 is a sample illustration of the first test signal.

FIG. 2 shows another preferred embodiment of the measurement geometry. The major difference of this geometry with the geometry shown in FIG. 1 is that two probes 3 and 16 are used, wherein the first probe 3 operates in a first measuring range and records the RRO, and the second probe 16 operates in a second more sensitive measuring range and records the NRRO.

The first probe 3 is firmly positioned relative to the MUT. The RRO signal is extracted from the resulting test signal in the same manner as described in relation to FIG. 1 in the context of the first test cycle.

The second probe 16, with an adjustable relative position, is located on the VCM 13 and tracks the RRO signal 7, which is continuously recorded by the first probe 3, in the manner described above. Thus, the second probe only records the NRRO signal 15, which is amplified and emitted by an amplifier 17.

In comparison to the first embodiment shown in FIG. 1, when the second test geometry is utilized, the MUT 1 need not be operated at a constant rpm speed because the position of the second probe 16 is regulated in real time by the RRO signal 7, which is continuously recorded by the first probe 3. Depending on the relative positioning of the probes 3, 16 at the outer perimeter of the rotor 2 of the MUT 1, attention should be paid to the phase shifts created between the RRO signal 7 and the command signal 18 for the VCM 13 in guiding the position of the second probe 16.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A method for measuring a repeatable runout and a non-repeatable runout of a rotating component of a spindle motor, comprising the steps of:
   in a first test cycle:
      recording a first test signal using a probe, said probe measuring changes in a distance between said probe and a rotating component of said spindle motor depending on an angle of rotation; and
      deriving and storing a repeatable runout signal from said first test signal;
   in a second test cycle:
      generating a command signal proportional to said repeatable runout signal;
      feeding said generated command signal to an electromechanical actuator supporting said probe;
      compensating a runout defined by said repeatable runout signal by changing said distance between said probe and said outer perimeter of the rotating component depending on said generated command signal;

recording a second test signal, wherein said second test signal defines the non-repeatable runout.

2. The method according to claim 1, further comprising a step of setting said probe into a precisely specified position with respect to said outer perimeter of the rotating component of the spindle motor during said first test cycle.

3. The method according to claim 1, further comprising the steps of filtering, storing and synchronizing said first test signal with said angle of rotation of the rotating component and deriving said command signal triggering said actuator from said synchronized first test signal.

4. The method according to claim 1, wherein said probe operates within a first measuring range during said first test cycle and within a second measuring range during said second test cycle.

5. The method according to claim 1, wherein said step of recording said first test signal is performed using a first probe, and wherein said step of recording said second test signal is performed using a second probe.

6. A device for measuring a repeatable runout and a non-repeatable runout of a rotating component of a spindle motor, comprising:

at least one probe located in close proximity to an outer perimeter of the rotating component of the spindle motor, said at least one probe being configured to measure changes in a distance between said probe and an outer perimeter of the rotating component depending on an angle of rotation and to generate a first test signal and a second test signal based on said measured changes in said distance;

means for recording said first test signal;

an electromechanical actuator supporting said at least one probe, said electromechanical actuator being configured to adjust the distance between the probe and the outer perimeter of the rotating component depending on said recorded first test signal; and an evaluation unit storing said first and said second test signals and determining the repeatable runout and the non-repeatable runout from the stored test signals.

7. The device according to claim 6, wherein said at least one probe is configured to operate within two selectable measuring ranges.

8. The device according to claim 6, wherein the probe is a capacitive probe.

9. The device according to claims 6, wherein the electromechanical actuator is a voice coil motor.

10. The device according to claim 6 further comprising a second probe, wherein said second probe and said at least one probe are distanced from the outer perimeter of the rotating component of the spindle motor.

11. The device according to claim 10, wherein said first signal is measured by said at least one probe and said second signal is measured by said second probe.

12. A device for measuring a repeatable runout and a non-repeatable runout of a rotating component of a spindle motor, comprising:

a first probe, configured to generate a first test signal depending on changes in a distance between said first probe and said rotating component of said spindle motor;

an electromechanical actuator supporting a non-repeatable runout probe, said electromechanical actuator being configured to adjust the distance between said non-repeatable runout probe and the rotating component depending on said first test signal, said non-repeatable runout probe being configured to generate a second test signal; and means for determining the repeatable runout from said first test signal and the non-repeatable runout from said second test signal, wherein said non-repeatable runout probe is one of said first probe and a second probe.

13. The device according to claim 12, wherein said first probe operates within a first measuring range.

14. The device according to claim 13, wherein distance changes of +/−50 μm can be measured within said first measuring range.

15. The device according to claim 12, wherein said non-repeatable runout probe operates within a second measuring range.

16. The device according to claim 15, wherein distance changes of +/−2 μm can be measured within said second measuring range.

* * * * *